(12) United States Patent
Culbertson et al.

(10) Patent No.: US 7,711,103 B2
(45) Date of Patent: May 4, 2010

(54) SYSTEM AND METHOD FOR INTELLIGENT SERVICE AGENT USING VOIP

(76) Inventors: Robert F. Culbertson, 17 Churchill Rd., Pittsburgh, PA (US) 15235; Wayne M. Scholar, 102 Red Oak Ct., Pittsburgh, PA (US) 15237

( * ) Notice: Subject to any disclaimer, the term of this patent is extended or adjusted under 35 U.S.C. 154(b) by 1045 days.

(21) Appl. No.: 11/410,264

(22) Filed: Apr. 24, 2006

(65) Prior Publication Data

US 2007/0036334 A1      Feb. 15, 2007

Related U.S. Application Data

(60) Provisional application No. 60/673,871, filed on Apr. 22, 2005.

(51) Int. Cl.
*H04M 7/00* (2006.01)
(52) U.S. Cl. ............... 379/221.15; 704/275; 704/270.1
(58) Field of Classification Search ............ 379/221.05, 379/220.01, 227; 704/275, 270.1, 276
See application file for complete search history.

(56) References Cited

U.S. PATENT DOCUMENTS

| 7,076,430 | B1* | 7/2006 | Cosatto et al. | 704/275 |
| 7,136,818 | B1* | 11/2006 | Cosatto et al. | 704/275 |
| 2002/0111811 | A1* | 8/2002 | Bares et al. | 704/275 |
| 2003/0093457 | A1* | 5/2003 | Goldick | 709/104 |
| 2005/0041687 | A1* | 2/2005 | Dowling et al. | 370/469 |

* cited by examiner

*Primary Examiner*—Creighton Smith
(74) *Attorney, Agent, or Firm*—The Webb Law Firm

(57) ABSTRACT

A system for forming a communication link between a first communications device and a second communications device includes a server configured to receive a call request from the first communications device. A virtual agent operating on the server is configured to (a) initiate a first outbound call to the first communications device in response to receiving the call request; (b) initiate a second outbound call to the second communications device; (c) form a first communications channel between the virtual agent and the first communications device; (d) form a second communications channel between the virtual agent and the second communications device; and (e) link the first communications channel to the second communications channel. An NLP engine and/or a learning engine are connected to the virtual agent. A method for forming a communication link between the first communications device and the second communications device utilizing the system is also disclosed.

21 Claims, 3 Drawing Sheets

FIG. 2

— Account Detail
Transaction History
CDSC Simulator
Distributions
Prices

[Call Me Now]

Print Friendly

MORNINGSTAR

Tax ID: 999-99-9999
Registration: JOHN SMITH
123 MAIN STREET
ANYTOWN, USA 99999

Note: Information that is not available for thi
Uncollected Shares: 0.000
Unissued Shares: 1,148.848
Issued Shares: 0.000
Total Shares: 1,148.848
Escrow Shares: 0.000

Withholding %
TEFRA: 10.00 %

FIG. 3

Call Me Now

Hi, I'm Abby. Thank you for choosing Call Me Now. Call Me Now is instant conferencing for immediate sales and service assistance. My role is to connect you with the appropriate representative. Once I have you both on the line, I will then join the connection. Please complete the following to initiate your immediate conference call. You will then be called and conferenced with a company representative. Thanks.

Name:
Phone:
Email:

[Submit]

FIG. 4

Call Me Now

Some one will be in contact with your shortly.

Thank you for your interest.

SYSTEM AND METHOD FOR INTELLIGENT SERVICE AGENT USING VOIP

CROSS REFERENCE TO RELATED APPLICATIONS

This application claims the benefit of U.S. Provisional Patent Application No. 60/673,871, filed Apr. 22, 2005, entitled "System and Method for Intelligent Service Agent Using VoIP," the contents of which are incorporated herein by reference.

BACKGROUND OF THE INVENTION

1. Field of the Invention

The present invention relates generally to an intelligent service agent and, more particularly, to an intelligent service agent operating within an Intel® HMP (Host Media Processing) server environment using Voice over Internet Protocol (VoIP) transmission lines.

2. Description of Related Art

A Session Initiation Protocol (SIP) is a signaling protocol used for establishing sessions in an Internet Protocol (IP) network. A session could be a simple two-way telephone call or it could be a collaborative multimedia conference session. The ability to establish these sessions means that a host of innovative services becomes possible, such as voice-enriched e-commerce, Web page click-to-dial, Instant Messaging with buddy lists, and IP Centrex services.

Over the past few years, the VoIP community has adopted SIP as its protocol of choice for signaling. SIP is a Request for Comments standard (RFC 3261) from the Internet Engineering Task Force (IETF), the body responsible for administering and developing the mechanisms upon which the Internet operates. SIP is still evolving and being extended as technology matures and SIP products are socialized in the marketplace.

The IETF's philosophy is one of simplicity, wherein a developer only needs to specify what, in fact, it desired to be specified. SIP is very much of this mold, having been developed purely as a mechanism to establish sessions. SIP does not know about the details of a session, as it just initiates, terminates and modifies sessions. This inherent simplicity means that SIP is scalable, extensible and adaptable for different architectures and deployment scenarios.

SIP is a request-response protocol that closely resembles two other Internet protocols, namely, HTTP and SMTP (the protocols that power the World Wide Web and e-mail, respectively). Consequently, SIP sits comfortably alongside Internet applications. Using SIP, telephony becomes another Web application and integrates easily into other Internet services. SIP is a simple toolkit that service providers can use to build converged voice and multimedia services.

In order to provide telephony services, there is a need for a number of different standards and protocols to come together, specifically, to ensure transport (e.g., RTP), to authenticate users (e.g., RADIUS, DIAMETER), to provide directories (e.g., LDAP), to be able to guarantee voice quality (e.g., RSVP, YESSIR) and to inter-work with today's telephone network. The foregoing discussion relates specifically to SIP.

The Intel® Host Media Processing (HMP) software platform offers flexibility in configuring media processing features and cost of ownership savings, because it only requires one or more standard computers without involving any proprietary hardware, such as digital signal processors (DSPs). Furthermore, HMP is a software-only building block for creating IP media servers for small and medium-sized businesses to implement services such as voice mail, unified messaging and conferencing.

The solutions that can be built utilizing HMP can include both video and Interactive Voice Response (IVR) systems, such as those often found in call centers that include applications with PBX functionality, voice messaging, unified messaging and conferencing servers. Exemplary video applications include video mail, video portals, video color ring back and video caller ID.

Because Intel® HMP, such as Netstructure HMP, is a software-only media-processing product for standard high volume (SHV) servers, costs are lower for procurement, development, deployment and maintenance. Since HMP is standards-based and does not require specialized hardware, solutions using the product are fast and easy to develop and deploy, easily scalable and very flexible. HMP is also an ideal solution for developing media servers for a modular network. Furthermore, in an IP-only environment, no physical inventory must be stocked or shipped, and no onsite installation is necessary.

Independent software vendors; original equipment manufacturers for computers and for telecom who build IVR, voice, or video mail, unified messaging, conferencing, and voice or video portal solutions for providers; and small and medium enterprises are envisioned to benefit from implementing HMP.

HMP allows one to easily scale the current solutions up and down and enable new solutions, such as applications for handheld devices and telematics, to be developed. The concept of developing a VoIP phone company on HMP is very similar to developing a Web-farm. Namely, if and when one needs to service more clients, one simply adds additional servers equipped with HMP.

The newest release of HMP may be used to create components for converged IP voice networks and the modular network, and can also be enabled in a time division multiplex (TDM) environment, utilizing interface boards for T-1/E-1 and digital stations designed for use with HMP.

Public Switched Telephone Network (PSTN) connectivity for HMP is available through media gateways, such as the Intel® NetStructure PBX-IP Media Gateway and through network interface boards that are available for Release 2.0. The gateway model enables a modular architecture with the media capability existing separately from the gateway. The network interface boards enable a single server solution that includes gateway capability and media.

The operating systems that the Intel® HMP solution supports are: Release 2.0 for Windows® and Release 1.5 for Linux. Release 2.0 runs on Windows XP® or Windows Server 2003. Release 1.5 runs on Red Hat® Enterprise Linux 3, SUSE® Linux Professional 9.2, and Debian® GNU/Linux. HMP currently supports Intel Pentium® III, Pentium® 4, and Pentium® M processors, as well as single and dual Intel® Xeon® processor configurations with respect to Releases 1.5 and 2.0. Release 2.0 also supports the Celeron® M processor. Hyper-Threading Technology is supported on both single and dual-processor configurations. It is to be understood that HMP may be supported on future hardware and configurations thereof. Release 2.0 for Windows® increases the potential system density from 240 ports of IVR or conferencing on RTP G.711 to 400 ports per server. This configuration has been qualified on a 3.6 GHz Dual Intel Xeon processor-based server, and has been determined to consume approximately 65% of the CPU. Release 1.5 for Linux delivers 240 channels of voice or 120 channels of video processing in a 3.2 GHz Dual Intel Xeon processor-based server with about 50% of processor capacity available for the application.

SIP support is currently available on all HMP releases for both Linux and Windows®. HMP is delivered with a software library that contains an API for integration purposes. Even hybrid environments can be handled by Intel NetStructure HMP. At present, with the newest release (2.0), Intel® NetStructure Digital Network Interface Boards provide a PSTN interface to HMP and gateway functionality. These boards allow application providers to support hybrid/converged TDM-IP solutions. The network interface boards are available in one, two or four ports and can support up to 400 Digital Signal Processors (DSP).

The aforementioned benefits associated with HMP and related hardware and software, including SIP integration, provide a platform for building full-featured, scalable and cost-effective software based IP media servers for various telephony applications.

SUMMARY OF THE INVENTION

The present invention is a system and method that allows an individual to initiate a telephone call from a Web site, television or other visual electronic communication medium to a person or an Interactive Voice Response (IVR) system operating on a backend responsible for the content of Web site. Generally, the present invention calls a phone of the individual, calls a phone of the Web site (e.g., specific department), connects the two phone calls and either records the resulting conversation or offers further assistance.

More specifically, the present invention utilizes one or more intelligent service agents, or virtual agents, to poll a telephone queue, which is populated by the pressing of a button on the Web site. The virtual agent then utilizes a Host Media Processing (HMP) platform and Voice over Internet Protocol (VoIP) or suitable technology to generate a first outbound call. Once the first outbound call is connected, the virtual agent then generates one or more additional outbound calls to connect the first call with subsequent virtual agent calls. The virtual agents are designed to converse with the individual using natural language and may perform other functions such as recording the call or assisting the individual within the call by invoking the IVR system.

A method for forming a communication link between a first individual and a first entity remote from the first individual includes the step of providing a server having a virtual agent operating thereon, wherein the virtual agent is connected to a natural language processing engine and/or a learning engine. The server is connected to a distributed communications network and includes a Host Media Processing platform configured to create a Session Initiated Protocol connection to a voice gateway, wherein the first communications channel utilizes the Session Initiated Protocol connection.

Additional steps include receiving a call request from the first individual, initiating a first outbound call in response to the call request and connecting to a communications device associated with the first individual, wherein a first communications channel is formed between the virtual agent and the first individual. The first outbound call is initiated by dialing a telephone number corresponding to the communications device associated with the first individual. Still, further steps include initiating a second outbound call in response to the call request and connecting to a communications device associated with the first entity, wherein a second communications channel is formed between the virtual agent and the first entity. The first communications channel is then linked to the second communications channel, whereby the communication link is formed between the first individual and the first entity. The first communications channel and the second communications channel are digital, wherein the communications device associated with the first individual is a voice over Internet protocol capable device. The virtual agent is configured to converse with the first individual.

The call request is initiated by selection of a call request feature by the first individual, wherein the call request feature is embodied in a visual electronic communication medium. For example, the visual electronic medium may be a Web site and the call request feature may be a clickable visual indicia situated on the Web site. The first entity may be affiliated with the Web site.

The first entity may be a second individual or an interactive voice response system. A further step includes invoking an interactive voice response system, whereby the interactive voice response system is communicatively connected to the first communications channel. Additionally, a third outbound call may be initiated such that the virtual agent connects to a communications device associated with a second entity. A third communications channel may therefore be formed between the virtual agent and the second entity. The second communications channel may be closed or disconnected and the first communications channel may be linked to the third communications channel, whereby a communication link is formed between the first individual and the second entity. The communication links of the present invention may be one of voice and video communication links.

A conversation between the first individual and the first entity may be recorded. Call control data may also be recorded. Exemplary call control data includes a phone number of the first individual, a time of the creation of the communication link, a duration of the communication link and an action performed by the virtual agent.

A system for forming a communication link between a first communications device and a second communications device remote from the first communications device includes a server remote from the first communications device and configured to receive a call request from the first communications device. A virtual agent operating on the server is configured to (a) initiate a first outbound call to the first communications device in response to receiving the call request; (b) initiate a second outbound call to the second communications device; (c) form a first communications channel between the virtual agent and the first communications device; (d) form a second communications channel between the virtual agent and the second communications device; and (e) link the first communications channel to the second communications channel. An NLP engine and a voice gateway may be connected to the virtual agent. A method for forming a communication link between the first communications device and the second communications device utilizing the system is also disclosed. The aforementioned system facilitates communications between the first communications device and the second communications device, but, more importantly, between the entities (human or computer) associated with the first communications device and/or second communications device.

Still other desirable features of the invention will become apparent to those of ordinary skill in the art upon reading and understanding the following detailed description, taken with the accompanying drawings.

BRIEF DESCRIPTION OF THE DRAWINGS

FIG. 2 is a screenshot of a Web site having a visual indicia that the individual may click to initiate a call request;

FIG. 3 is a screenshot showing instructions and offering fields to be filled out by the individual to receive a call from a virtual agent of the system;

FIG. 4 is a screenshot showing a confirmation dialog confirming that the virtual agent will call the individual.

DESCRIPTION OF THE PREFERRED EMBODIMENTS

The present invention will now be described with reference to the accompanying figures. It is to be understood that the front and back ends of the system illustrated in the attached figures and described in the following specification are simply exemplary embodiment of the present inventions. Thus, it is to be understood that the present invention may be used in connection with other telephony applications and may be implemented in other configurations suitable for such applications.

Figure 1:
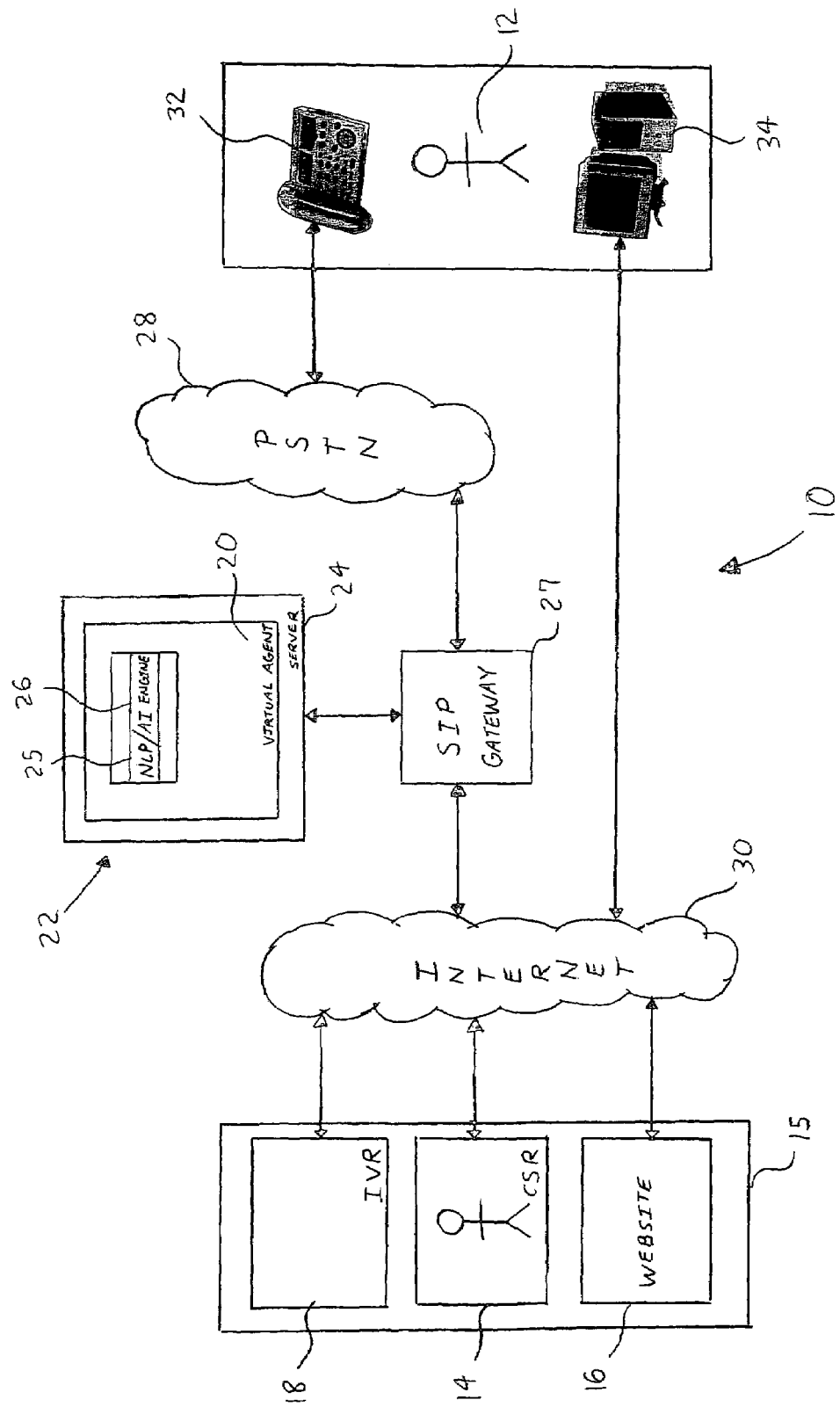
FIG. 1 is a diagram illustrating the entities and communicative connectivity therebetween in a system for establishing a communication link between an individual and an entity, in accordance with the present invention.

FIG. 1 discloses a system 10 for establishing a communication link between an individual 12 and an entity, desirably remote from the individual 12. The entity may be another individual, such as a human representative 14 (e.g., customer service representative) or other person associated with a company 15. The entity may also be an Interactive Voice Response (IVR) system 18, which may also be associated with the company 15, in that it is programmed to provide information relating to products or services sold by the company 15. The standard operation of a typical IVR is known in the art and will not be specifically discussed herein. The entity may also be a virtual agent 20 that may not necessarily be associated with the company 15. For example, the virtual agent 20 may reside with a service provider 22 that functions similar to an Application Service Provider (ASP) in that the service provider 22 contracts out services provided by the virtual agent 20. To this end, in the desirable embodiment, the virtual agent 20 resides on a server 24 associated with the service provider 22. The virtual agent 20 is embodied as a compiled computer routine. The virtual agent 20 includes a Natural Language Processing (NLP) engine 25 and/or a learning engine 26, such as an Artificial Intelligence (AI) engine. The virtual agent 20, via the server 24, is communicatively connected to a Session Initiation Protocol (SIP) gateway 27 or proxy and a Public Switched Telephone Network (PSTN) 28. The SIP gateway 27 is communicatively connected to a distributed communications network, such as the Internet 30. In the desirable embodiment, the virtual agent 20 operates on a Host Media Processing (HMP) platform configured to create an SIP connection via the SIP gateway 27. It is to be understood that a gateway, SIP or otherwise, is not required if the virtual agent 20 utilizes a straight SIP connection directly to a carrier (e.g., tier 1 ISP). The standard operation of SIP is known in the art and will not be specifically discussed herein.

The individual 12 may access the virtual agent 20 via a communications device, such as a phone 32, communicatively connected to the PSTN 28. The individual 12 may access the Internet 30 via a communications device, such as a computer 34. The computer 34 is configured to access one or more Web sites 16 connected to the Internet 30. As shown in FIG. 1, the Web site 16 is associated with the company 15. Accordingly, the company 15 may provide information to the individual 12 in a variety of mediums including, but not limited to the Web site 16, the representative 14, and the IVR 18. It is to be understood that the communications devices discussed herein are exemplary communications devices and that the system 10 and method associated therewith may utilize any suitable communications devices.

Figure 5:
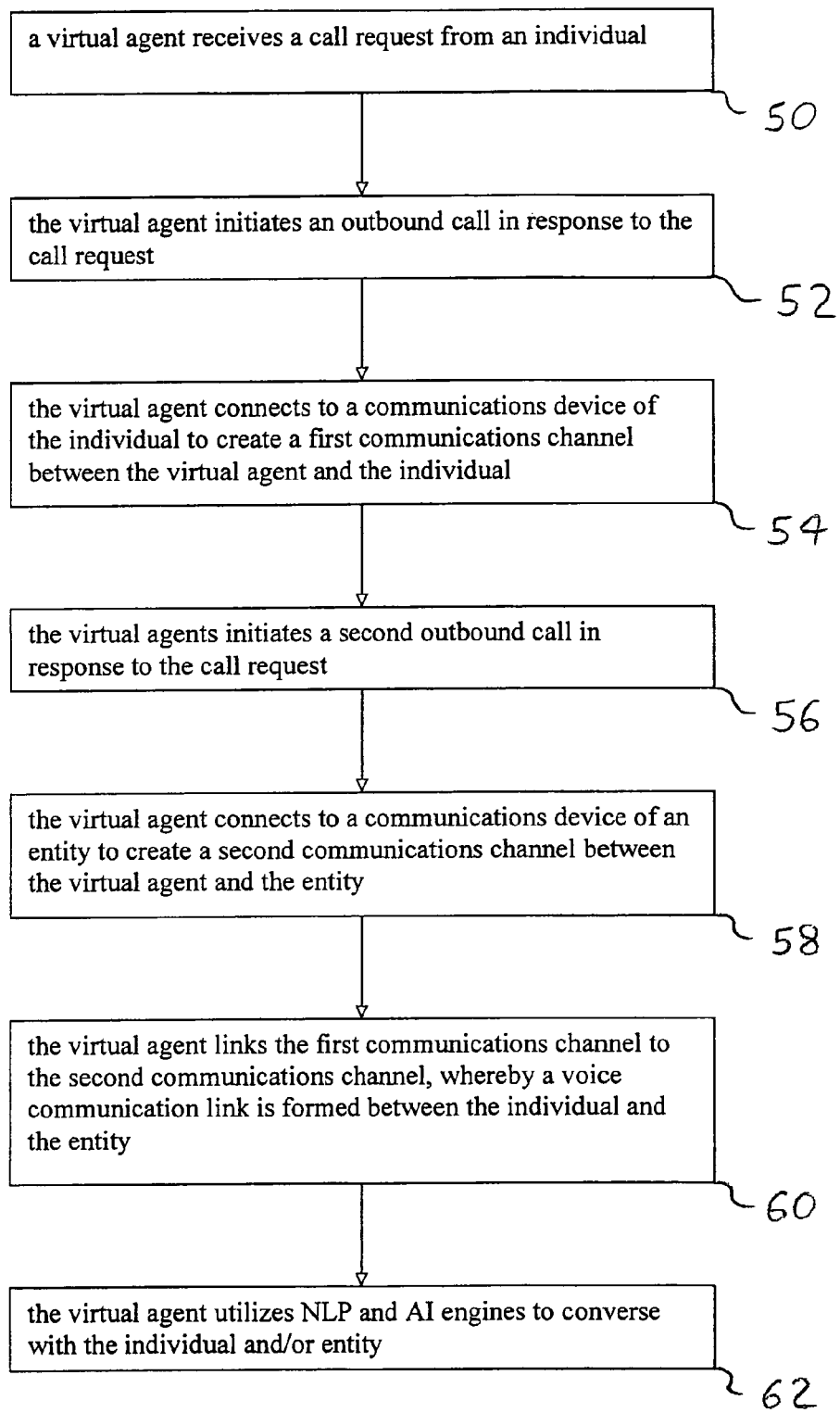
FIG. 5 is a flow chart setting forth the basic steps of establishing the communication link between the individual and the entity via the virtual agent.

With continuing reference to FIG. 1, FIGS. 2-4 in connection with the flowchart of FIG. 5 illustrate how the system 10 may be used to establish a communication link between the individual 12 and the representative 14 in an exemplary embodiment. The individual 12 is presented with a Web page 40 of the Web site 16 that is displayed on the computer 34. The Web page 40 may include a call request feature 42, such as a clickable button entitled "Call Me Now." However, it is to be understood that other visual indicia may be used to function as the call request feature 42. Alternatively, the call request feature 42 may be embodied as a voice driven command. It is also to be understood that the call request feature 42 or suitable equivalent may be embodied in other visual electronic communication mediums including, but not limited to, a television, an in/on-dash vehicle display and an appliance. These other electronic communication mediums are envisioned to be communicatively connected to a content provider via a proprietary network or the Internet 30.

The individual 12 may click or otherwise select the visual indicia, which causes the Web site 16 to display a pop-up or another Web page 44 having fields 46 to be filled out by the individual 12 in order to receive a call from the virtual agent 12. After completing the fields 46 and submitting the requested information, a call request is transmitted from the individual 12 via the computer 34. The individual 12 may be informed via a Web page 48 that the call request has been acknowledged and that the individual will receive a call in due course. The call request may be routed directly or indirectly to the virtual agent 20. This step is shown in block 50 of FIG. 5. For example, the computer 34 may transmit the call request to the server 24 via the Internet 30 or, upon receipt of the call request, the Web site 16 may forward the call request to the server 24. If the server 24 and, therefore, the virtual agent 20, are local to the company 15, then the call request may be routed from the Web site 16 to the server 24 along a local network.

Upon receipt of the call request, the virtual agent 20 initiates a first outbound call, as shown in block 52. Desirably, the first outbound call is initiated by dialing a telephone number corresponding to the communications device, such as the phone 32, associated with the individual 12. The resultant call will be established through the SIP gateway 27 and the PSTN 28. Accordingly, a first communications channel is formed between the virtual agent 20 and the individual 12, as shown in block 54. Further in response to the call request, contemporaneously with, prior to, or after initiating the first outbound call, the virtual agent initiates a second outbound call, as shown in block 56. Accordingly, a second communications channel is formed between the virtual agent 20 and an entity, as shown in block 58. As previously discussed, the entity may be the human representative 14 or the IVR system 18.

After establishing the first and second communications channels, the virtual agent 20 may link the channels to form a communication link between the individual 12 and the entity, as shown in block 60. For example, the communication link may be between a communications device associated with the representative 14 and the phone 32 of the individual 12. As shown in FIG. 1, such a communication link would be formed through the Internet 30, the SIP gateway 27, the server 24, and the PSTN 28. In the exemplary embodiment of FIG. 1, the communications device associated with the representative 14 may be an SIP phone or suitable equivalent, as the representative 14 is connected to the virtual agent 24 via the SIP gateway 27. Desirably, the communication link between the individual 12 and the entity 14 is a voice link; however, the communication link may be a video link or any other data link configured to facilitate transmission of multimedia content and communications. It is to be understood that the various communications channels may be established through analog lines, digital lines, or a combination thereof. Accordingly, instead of a phone number being associated with the communications device of the individual 12, an addressable network identifier or user ID may be utilized. For example, the communications device of the individual may be a VoIP capable device that utilizes the Internet 30 to communicate with the virtual agent 20.

In devices that provide for a graphical user interface (GUI), such as a cell phone or mobile personal digital assistant, the virtual agent 20 may be configured to interact with the individual via an avatar or suitable character. This allows for a more personalized interaction with the virtual agent 20. For example, the avatar may be embodied in client software that has been downloaded to reside within the memory of the cell phone. Accordingly, the client software is configured to communicate via the cell phone with corresponding server software associated with the virtual agent 20. Alternatively, the cell phone may be configured to access the virtual agent 20 without the need for client-specific software. For example, the individual may directly connect to the server by opening up a Web site or portal via the existing communications program (e.g., Web browser) of the cell phone. Depending upon the communications device and capabilities associated with the virtual agent 20, the individual may interact with the virtual agent 20 through his or her voice, on-screen commands/prompts, or a combination thereof.

Desirably, the virtual agent 20 maintains an association with the communication link, even after the individual 12 and the entity have been connected to each other. The virtual agent 20 may be a part of the ensuing conversation to facilitate the discussion and offer pre-call, in-call, or post-call functionality. The virtual agent 20 is aware of if and when the individual and/or entity have disconnected. Generally, the virtual agent 20 utilizes the NLP engine 25 and the AI engine 26 to converse with the individual 12 or the entity, as shown in block 62. In connection with the HMP platform, an environment is provided in which the virtual agent 20 is able to answer questions, up-sell, cross-sell, ask questions of the individual, and become more intelligent over time with respect to the characteristics associated with the individual 12. With respect to the conversational aspect, the server receives either an analog or digital signal which the HMP platform converts into a standard digital format. The virtual agent 20 then separates the spoken words into grammatical parts (e.g., subject, noun, verb, adjective). Search technology associated with the virtual agent 20 matches the grammatical parts with corresponding questions and responses that are available on file. Accordingly, the virtual agent 20 is configured to deliver an appropriate response to the individual 12. These questions and responses may be previously defined or may be added by the learning engine 26 over the course of operation of the virtual agent 20. Specifically, the learning engine 26 allows the virtual agent 20 to become more intelligent the more it interacts with the individual 12 or others. Accordingly, the future needs of the individual 12 or subsequent users of the system 10 can be more accurately and efficiently met and/or anticipated. The principles of a generalized learning/AI engine are known in the art and are not specifically discussed herein.

An another example of the functionality of the virtual agent 20 includes the ability to engage the services provided by the IVR system 18 or may transfer the individual 12 from the representative 14 to the IVR system 18, or vice versa. The virtual agent 20 may also be configured to record the conversation of the individual 12 and the representative 14 and related call control data. For example, the virtual agent 20 may record the phone number of the individual, a time of the creation of the communication link, a duration of the communication link, and actions that were performed by the virtual agent 20 before, during, or after the conversation. This data may then be stored in a database that is accessible to the virtual agent 20 for future reference or quality control purposes. The virtual agent 20 may be configured to create additional outbound calls before, during, or after the creation of the communication link. For example, the virtual agent 20 may initiate a third outbound to another entity, such as another representative, IVR, or individual. Accordingly, a third communications channel is formed between the virtual agent 20 and the other entity. The virtual agent 20 may switch between the existing communications channels, combine and link the existing communications channels, or disconnect any of the existing communications channels. For example, the virtual agent 20 may close or disconnect the second communications channel and link the first communications channel to the third communications channel. This scenario would arise, for example, when the service agent 20 transfers the individual 12 from the representative 14 to the IVR system 18 while maintaining the first communications channel with the individual 12.

In an alternative embodiment, the individual may contact the virtual agent 20 directly through a communication line or port, such as a dial-in connection, to create a call session with the virtual agent 20. This connection results in a corresponding communications channel to be created from the individual 12 through the PSTN 28 and the SIP gateway 27 to the virtual agent 20. Due to the dial-in connection aspect of the system 10, the virtual agent 20 may identify the caller based upon the Caller ID. A user profile corresponding to the caller may be accessible to the virtual agent 20. That user profile may store data specific to that caller, which the virtual agent 20 may use to personalize the call session. Specifically, the user profile may include data obtained, processed, and/or associated with previous call sessions with that user. Accordingly, the virtual agent 20 is aware of previous interactions with the user, which allows the virtual agent 20 to resume a conversation from a logical point. Having access to an existing knowledge base of data specific to that user is conducive to having a more natural and efficient conversation with the user. In the absence of the Caller ID, the user may identify him or herself in other ways, such as by entering an identification number or other unique identifier, which is associated with the user profile.

In a further alternative embodiment, the virtual agent 20 can initiate phone calls on its own from pre-existing data sources. For example, the virtual agent 20 may be provided with lists (e.g., calling lists, client lists) that contain phone numbers that the virtual agent 20 may call. Furthermore, the virtual agent 20 may be configured to scan e-mail messages and extract phone numbers or other contact information therefrom. These phone numbers may then also be used to initiate phone calls with the corresponding individuals. Accordingly, it is to be understood that the virtual agent 20 is not limited to utilizing only user-provided contact, but instead may use any electronic information and turn it into possible phone calls.

An exemplary conversation between the virtual agent 20 and a user utilizes the following fact. The user is named Joe Smith, age 45, who is a Type-2 diabetic. Joe Smith did not pick up his prescription of glucophage. Glucophage is a diabetes medicine used to lower insulin levels in non-insulin dependant diabetes patients. Joe Smith just recently became diabetic.

This exemplary conversation illustrates an outbound phone calling campaign for the lapsed-prescription marketplace. Specifically, an electronic "lead" arrives from an existing bank of data of patients who have not picked up their lapsed prescriptions. This information is made accessible to the virtual agent 20. Accordingly, the virtual agent 20 is charged with the responsibility of identity validation and message delivery. The virtual agent 20, with respect to this scenario, is configured to provide refill information and provide convincing if a refill is refused. Thereafter, the virtual agent 20 sets an up-front contract to allow the user to pick up the prescription. The virtual agent 20 is also configured to provide a personalized interaction and build rapport with the user. For example, personalized information is provided with respect to on-sale items in the pharmacy. The pathway associated with this exemplary conversation involves the virtual agent 20 asking questions on drugs, sale items in the pharmacy, a wish list, and whether to contact the pharmacist.

Virtual Agent: Hello, may I speak with Mr. Joe Smith, please?
User: "This is Joe speaking."
Virtual Agent: Joe, I am calling from your First-Aid Pharmacy. My name is VirtualAgent. I'm your pharmacist's personal pharmacy assistant. Are you doing well today?
User: "Yes, I am."
Virtual Agent: Well, I'm calling you because your prescription for Glucophage needs to be refilled.
User: "What was that the prescription for again?"
Virtual Agent: It was for Glucophage. You had it last filled on April 30$^{th}$.
User: "I'm not sure I really want the refill."
Virtual Agent: Well, we could have it ready for you today. You could pick it up in 45 minutes. Are you sure you don't want to get the refill as your doctor ordered?
User: "No, I don't think I need the refill."
Virtual Agent: Please remember that your medication should be taken daily. Three times or every four hours as prescribed. Your first prescription was only for 30 days. You should fill your prescription to remain on your doctor's prescribed therapy. You should always consult your doctor before removing yourself from any prescribed medication or making any changes other than those that your doctor has advised. And this medication, in particular, is cumulative, which means that it requires ongoing reinforcement; otherwise the drug cannot work as prescribed. Are you sure you don't want the refill?
User: "Now that you've reminded me about my doctor's directions, yes, I probably should get the refill."
Virtual Agent: Will you be coming in to pick up your prescription?
User: "Yes, sometime later today."
Virtual Agent: Do you know when today?
User: "Sometime after three."
Virtual Agent: Your prescription will be ready at approximately two o'clock today. Does that work for you?
User: "Yes, it's fine. I'll be in by three or maybe a little earlier."
Virtual Agent: I also see that you visited our store in Squirrel Hill three weeks ago. Did everything go well for you?
User: "Yes everything was fine."
Virtual Agent: Your pharmacist, Mr. Taylor, told me that you like our First-Aid brand foot powder as well as our First-Aid brand hand lotion. He just wanted to let you know that both of those items are on special this week.
User: "That's great. Maybe I'll pick some up when I come in today"
Virtual Agent: Now, do you have any other questions that I could help you with?
User: "I have one question. What is the proper way to take Glucophage?"
Virtual Agent: Glucophage is taken by mouth with meals. You should drink plenty of fluids while taking this medication. Use this medication regularly in order to get the most benefit from it. Remember to use it at the same times each day. Your dosage is based on your medical condition and response to therapy, so use the amount you are prescribed.
User: "Is it OK to take diet pills with Glucophage?"
Virtual Agent: Great question; in order to give you a precise answer, and making sure that your safety is my number one concern, can I transfer you to your pharmacist?
User: "Yes, this would be great."
Virtual Agent: Mr. Smith, I am transferring you now. If for some reason your pharmacist is busy, I will set up a time when your pharmacist can call you to answer this question. Please stay on the line for just a little while longer, and I'll be right back.
Virtual Agent: Thank you again for waiting Mr. Smith. His line is busy, but he recommended that we talk at 10:15 tomorrow morning. If that's ok with you, I'll be glad to call you back at 10:15 tomorrow morning, and connect you to Mr. Taylor, your First-Aid pharmacist.
User: "Yes, that would be fine. Talk to you then."
Virtual Agent: Thank you again Mr. Smith and goodbye for now.

In the next exemplary conversation, the pharmacist, Mr. Dan Taylor contacts the virtual agent 20. Specifically, Mr. Taylor calls the virtual agent 20 to request information about the patient, Mr. Smith. Mr. Taylor told Joe Smith that he would call him back; however, Mr. Taylor misplaced Joe Smith's telephone number. Mr. Taylor is currently out of the office on his cell phone, so he doesn't have access to the computer storing Mr. Taylor's contact information. The virtual agent 20 recognizes Mr. Taylor's cell phone number and allows him access to the virtual agent 20.

Virtual Agent: Welcome to VirtualAgent, can you please type your personal identification number?
Mr. Taylor: 1 1 1 1
Virtual Agent: Thank you Dan. Would you like to read e-mail, place a phone call, or ask a question?
Mr. Taylor: "Place a phone call"
Virtual Agent: Who would you like to call? Your directory includes: Smith, Davids and Class.
Mr. Taylor: "I need to call Mr. Joe Smith."
Virtual Agent: His prescribed medication is Glucophage. I'm connecting you now.

Another exemplary conversation illustrates how an automobile dealership may use the present invention to qualify sales leads and sell a product or service. Specifically, automobile dealerships receive Internet prospects from many sources including their own Web site, third-party Web sites that function as lead aggregators (e.g., Vehix®, AutoByTel®, AutoUSA®), and OEM (e.g., Ford, Lexus, Infiniti) Web sites. These leads are typically not followed up in a timely fashion. The virtual agent 20 may be used to turn Internet leads into immediate phone calls, adding a personal and "old-fashioned" touch to a high-tech sales tool. The average Customer Relationship Management (CRM) system often sets up a daily sales plan for its sales people. In the instant case, instead of requiring a salesperson to sit at a terminal and march through that plan, the virtual agent 20 will call the salesperson and march through the plan with them over the phone. The virtual agent 20 places an outbound phone call to the salesperson at a predefined time.

Virtual Agent: Hello, this is VirtualAgent. I'm here to go through your daily sales plan with you. Press '1' to begin your daily sales plan or Press '3' to have me call you back in 30 minutes.

Salesperson: Presses '1'

Virtual Agent: This call is with Sue Jones. She is interested in a 2007 GMC Yukon. Her last e-mail was on Monday, March 6$^{th}$. You last spoke to her on Tuesday, March 7$^{th}$. Your notes say: She may need a different truck. Press '1' if you'd like me to connect you, '2' if you'd like to repeat this information, or '3' to skip to the next prospect.

Salesperson: Presses '1'

Virtual Agent: Please wait while I connect your call.

Salesperson: "Hello—Hi, how are you doing? This is James Keys at Yourtown GMC. I heard that you were interested in a new GMC Yukon. Is that correct?"[and the conversation continues]

When the conversation is over, the virtual agent 20 knows when the line is dead, and responds:

Virtual Agent: That was a great call. Press '1' if you'd like to record a note for your files, or press anything else to continue.

Salesperson: Presses '3'

Virtual Agent: This call is with Mike Brown. He is interested in a 2006 GMC Sierra 2500 HD Crew Cab. His last e-mail was on Wednesday, March 8$^{th}$. You last spoke to him on Monday, March 6$^{th}$. Your notes say: He may need to order a truck. Press '1' if you'd like me to connect you, '2' if you'd like to repeat this information, or '3' to skip to the next prospect.

Salesperson: Presses '1'

Virtual Agent: Please wait while I connect your call.

Salesperson: "Hello—this is Yourtown GMC. How are you today? I heard that you were interested in a 2500." [and the conversation continues]

When the conversation is over, the virtual agent 20 knows when the line is dead, and responds:

Virtual Agent: That was a great call. Press '1' if you'd like to record a note for your files, or press anything else to continue.

Salesperson: Presses '3'

Virtual Agent: This call is with: Dorothy Taylor. She is interested in a 2006 Buick Lacrosse CX 4-Door Sedan. Her last e-mail was on March 8$^{th}$. It's a new Internet lead. Press '1' if you'd like me to connect you, '2' if you'd like to repeat this information, or '3' to skip to the next prospect.

Salesperson: Presses '1'

Virtual Agent: Please wait while I connect your call.

Salesperson: "Hello, is this Dorothy Taylor?"

"Yes it is—who is this?"

"This is James Keys from Yourtown Buick, Pontiac, GMC."

"Wow, I just inquired on the Internet."

"Yes, is that quick enough? (asks jokingly)" [and the conversation continues]

Virtual Agent: That was a great call. Press '1' if you'd like to record a note for your files, or press anything else to continue.

Salesperson: Presses '3'

Virtual Agent: Great work! You have no more contacts in your daily sales plan. Thank you for using VirtualAgent today.

In the next exemplary conversation, a prospect has entered his contact information online on a lead aggregator Web site. The virtual agent 20 immediately generates a phone call to the automobile dealership to provide the salesperson with the customer's name and specific vehicle information.

Virtual Agent: VirtualAgent has a lead from Jim Owens. His phone number is 412-555-1234. Press '1' to connect to the customer, '2' to hear the customer information again, or '3' to reject this lead. Press '0' for customer support. If you are the receptionist, please transfer this call to the Internet Sales Department.

Salesperson: Presses '1'

Virtual Agent: We are calling Jim Owens. He is interested in a BMW, 3-Series. His phone number is 412-555-1234. Just wait while I get him on the phone. This call may be recorded for training purposes.

Salesperson: "Hi, Jim. I hear you're interested in a 3-Series BMW."

"Wow, that was really fast."

"We pride ourselves on our good service." [and the conversation continues]

The present invention may be summarized as a VoIP connection, accomplished within an HMP environment by a virtual agent, between two communication end points that engage and interact to perform various actions. Accordingly, the aforementioned system 10 may easily be modified to operate in connection with other applications. Exemplary, but non-limiting uses of the present invention include: (a) synthesizing a human customer support agent, instructor or educator, sales representative/sales person, or distributor of information; (b) capturing user input and using it to make decisions; (c) having the ability to interact with a product or service or a sponsor of a product or service in the area of interactive advertising; (d) integrating with an Internet banner advertisement; (e) translating languages other than English (e.g., patents in other countries; from one language to another); (f) using as a next-generation search engine portal for the Internet; (g) using in automobiles (e.g., on-dash display), appliances, vending machines, GPS location devices, personal assistants, or virtual reality; (h) interacting with users via video over a mobile device; (i) using in conjunction with a television or WebTV® as a personal assistant or guide; (j) using as a personal computer help application; (k) using in e-books for telling an interactive story; (l) using in robots and toys as a brain for the robot that controls its thinking and actions; (m) using in movie trailers; (n) using with a content provider with respect to how people ask questions to obtain content therefrom; (o) using for online shopping or use with an online shopping cart; and (p) using on a handheld or mobile device (e.g., personal digital assistant).

The invention has been described with reference to the desirable embodiments. Modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A method for forming a communication link between a first individual and a first entity remote from the first individual, the method comprising the steps of:

providing a server having a virtual agent operating thereon, wherein the server is connected to a distributed communications network, wherein the virtual agent is connected to a natural language processing engine;

receiving a call request from the first individual;

initiating a first outbound call in response to the call request;

connecting to a communications device associated with the first individual, wherein a first communications channel is formed between the virtual agent and the first individual;

initiating a second outbound call in response to the call request;

connecting to a communications device associated with the first entity, wherein a second communications channel is formed between the virtual agent and the first entity; and linking the first communications channel to the second communications channel, whereby the communication link is formed between the first individual and the first entity.

2. The method of claim 1, wherein the server includes a Host Media Processing platform configured to create a Session Initiated Protocol connection with at least one of the communications devices associated with the first individual and the first entity.

3. The method of claim 2, wherein the call request is initiated by selection of a call request feature by the first individual, wherein the call request feature is embodied in a visual electronic communication medium.

4. The method of claim 3, wherein the visual electronic communication medium is a Web site and the call request feature is a clickable visual indicia situated on the Web site.

5. The method of claim 3, wherein the visual electronic communication medium is one of a cellular phone, a mobile personal digital assistant, a television, a vehicle on-dash display, and a GPS location device.

6. The method of claim 2, wherein the virtual agent is further connected to a learning engine.

7. The method of claim 2, wherein the virtual agent is configured to converse with the first individual.

8. The method of claim 4, wherein the first entity is affiliated with the Web site.

9. The method of claim 1, wherein the first entity is a second individual.

10. The method of claim 1, wherein the first entity is an interactive voice response system.

11. The method of claim 2, wherein the first outbound call is initiated by dialing a telephone number corresponding to the communications device associated with the first individual.

12. The method of claim 2, wherein the first communications channel and the second communications channel are digital, wherein the communications device associated with the first individual is a Voice over Internet Protocol capable device.

13. The method of claim 9, further comprising the step of invoking an interactive voice response system, whereby the interactive voice response system is communicatively connected to the first communications channel.

14. The method of claim 1, further comprising the steps of:
initiating a third outbound call; and
connecting to a communications device associated with a second entity, wherein a third communications channel is formed between the virtual agent and the second entity.

15. The method of claim 14, further comprising the steps of:
closing the second communications channel; and
linking the first communications channel to the third communications channel, whereby a communication link is formed between the first individual and the second entity.

16. The method of claim 2, further comprising the step of recording a conversation between the first individual and the first entity.

17. The method of claim 2, further comprising the steps of recording call control data, wherein the call control data is at least one of:
a phone number of the first individual;
a time of the creation of the communication link;
a duration of the communication link; and
an action performed by the virtual agent.

18. The method of claim 1, wherein the communication link is one of a voice and video communication link.

19. A system for forming a communication link between a first communications device and a second communications device remote from the first communications device and facilitating communications therebetween, wherein the system comprises:
a server configured to receive a call request from the first communications device, wherein the server is remote from the first communications device;
a virtual agent operating on the server, wherein the virtual agent is configured to:
initiate a first outbound call to the first communications device in response to receiving the call request;
initiate a second outbound call to the second communications device;
form a first communications channel between the virtual agent and the first communications device;
form a second communications channel between the virtual agent and the second communications device; and
link the first communications channel to the second communications channel, whereby the communication link is formed between the first communications device and the second communications device; and
a natural language processing engine communicatively connected to the virtual agent.

20. The system of claim 19, wherein the server includes a Host Media Processing platform configured to create a Session Initiated Protocol connection with at least one of the first communications devices and the second communications device.

21. The system of claim 20, wherein the virtual agent is further connected to a learning engine.

* * * * *